United States Patent [19]
Suzuki et al.

[11] Patent Number: 5,396,869
[45] Date of Patent: Mar. 14, 1995

[54] FUEL SUPPLY CONTROL DEVICE OF INTERNAL-COMBUSTION ENGINE

[75] Inventors: Norio Suzuki; Kazuo Hirabayashi; Yosuke Tachibana, all of Tochigi, Japan

[73] Assignee: Honda Giken Kogyo Kabushiki Kaisha, Tokyo, Japan

[21] Appl. No.: 95,592

[22] Filed: Jul. 26, 1993

[30] Foreign Application Priority Data

Jul. 27, 1992 [JP] Japan ................... 4-218711

[51] Int. Cl.⁶ ............... F02D 41/04; F02D 41/06; F02D 41/08
[52] U.S. Cl. ............... 123/399; 123/361; 318/696
[58] Field of Search ........ 123/399, 361, 339; 318/685, 696; 251/129.01-129.22

[56] References Cited

U.S. PATENT DOCUMENTS

| | | | |
|---|---|---|---|
| 4,371,822 | 2/1983 | Otsuka et al. | 318/696 |
| 4,684,866 | 8/1987 | Nehmer et al. | 318/696 |
| 4,854,283 | 8/1989 | Kiyono et al. | 123/361 |
| 4,855,660 | 8/1989 | Wright et al. | 318/696 |
| 4,882,530 | 11/1989 | Kabune et al. | 318/696 |
| 4,929,879 | 5/1990 | Wright et al. | 318/696 |
| 5,050,552 | 9/1991 | Riehemann et al. | 123/361 |
| 5,059,883 | 10/1991 | Takahashi | 318/696 |
| 5,163,402 | 11/1992 | Taguchi et al. | 123/361 |
| 5,201,888 | 4/1993 | Beach, Jr. et al. | 251/129.13 |
| 5,298,846 | 3/1994 | Shimizu et al. | 318/685 |
| 5,304,910 | 4/1994 | Loncle et al. | 318/685 |

FOREIGN PATENT DOCUMENTS 58-204799 11/1983 Japan.
62-294743 12/1987 Japan.

Primary Examiner—Raymond A. Nelli
Assistant Examiner—Thomas N. Moulis
Attorney, Agent, or Firm—Nikaido, Marmelstein, Murray & Oram

[57] ABSTRACT

Disclosed is a fuel supply control device which can properly control fuel supply at any time by recovering within a short time in the event of out of phase in the drive of the step motor. In a fuel supply mechanism of an internal-combustion engine having a fuel supply control means for controlling the quantity of intake air or fuel supplied into the engine, a step motor for driving the fuel supply control means, and a control value output means for outputting control values to the step motor, the fuel supply control device comprises a position sensor for detecting the control position of the fuel supply control means, a out of phase detecting means for detecting the out of phase of the step motor from the control values supplied from the control value output means and the control position detected by the position sensor, a out of phase step value computing means for converting, into the number of steps of the step motor, a deviation between the control value and control positions at the time of detection of the out of phase condition of the step motor by the out of phase detecting means, and a control value correcting means for correcting the control values of the step motor by using the number of steps determined by the out of phase step value computing means.

4 Claims, 10 Drawing Sheets

FUEL SUPPLY CONTROL DEVICE OF INTERNAL-COMBUSTION ENGINE

BACKGROUND OF THE INVENTION

1. Field of the Invention

The present invention relates to a fuel supply control device of an internal-combustion engine and, more particularly, to a step motor drive control for controlling a step motor which drives a control means such as a throttle valve for controlling the quantity of air or the quantity of fuel to be supplied to an internal-combustion engine such as a gasoline engine or a diesel engine.

2. Description of the Related Art

This type of step motor drive control is required to have high accuracy and a fast response time.

For example, when the throttle valve is driven to control its opening by the step motor, the step motor must be operated frequently to turn the throttle valve from the open side to the closed side, or reversely from the closed side to the open side, and from drive to stop, or to switch a drive control mode, in accordance with a demand from a drive control system, in quick response to the demand to control the amount of opening of the throttle valve.

The step motor in this case is likely to go out of phase owing to the inertia force of the throttle valve. To prevent this out of phase condition, various methods have been developed such as the provision of a large margin to a required torque of the step motor relative to a load, and, particularly, the hold of phase excitation immediately before the input of an OPP signal at the time of an opposite turn for a specific period of time (Japanese Patent Laid-Open No. Sho 58-204799), and the delay of supply of a drive pulse signal for a specific period of time (Japanese Patent Laid-Open No. Sho 62-294743).

The out-of-phase condition occur during other than the opposite turn too, and it is difficult to completely prevent the out of phase condition by the above-described methods even during the opposite turn.

Furthermore, increasing a torque margin of the motor is accompanied by such problems as the use of a large-sized motor and the occurrence of an overheating resulting from the increased consumption of electric current.

Furthermore, with an instantaneous disconnection of a wiring harness or a coupler taken into consideration, the step motor will lose synchronism when driving with a sufficient torque, resulting in a failure in the control of throttle valve opening which requires high accuracy.

Besides the above-mentioned methods, there is a method for controlling a motor position by feeding back a value detected by a sensor which detects the position, or opening, of the throttle valve. This position sensor, however, is required to be of high accuracy and high reliability, and moreover sacrifices such an advantage as the possibility of open-loop control which is a feature of the step motor.

SUMMARY OF THE INVENTION

In view of the above-described disadvantages inherent in the heretofore known techniques which are hard to fully prevent the out of phase condition, it is an object of the present invention to provide a fuel supply control device capable of properly controlling fuel supply in a short period in the event of out of phase.

To accomplish the above object, a fuel mixture control mechanism of the internal-combustion engine has a fuel mixture control means for controlling or adjusting the amount of intake air or the amount of fuel to be supplied into the internal-combustion engine, a step motor for driving the fuel mixture control means, and a control value output means for outputting a control value to the step motor. In this fuel supply control means, the fuel mixture control device includes a position sensor which detects a control position of the fuel mixture control means, an out of phase detecting means for detecting the out of phase condition of the step motor on the basis of a control value from the control value output means and a control position detected by the position sensor, an out of phase step value computing means for converting a deviation between the control value and the control position at the time of detection of the out of phase condition of the step motor by the out of phase detecting means into the number of steps of the step motor, and a control value correction means for correcting a control value of the step motor by the use of the number of steps determined by the out of phase step value computing means.

Upon the detection of the out of phase condition, the control value of the step motor will be corrected by the use of the number of steps corresponding to the deviation between the control value and the control position stated above; in the event of out of phase, therefore, the control value will immediately be corrected, so that the fuel supply control means can be placed in a proper control position by subsequent driving.

The foregoing object and other objects of the present invention will become apparent from the following description of embodiments of the invention, together with the accompanying drawings.

DESCRIPTION OF THE PREFERRED EMBODIMENT

One embodiment of a fuel supply control device according to the present invention will hereinafter be explained with reference to FIGS. 1 to 8.

Figure 1:
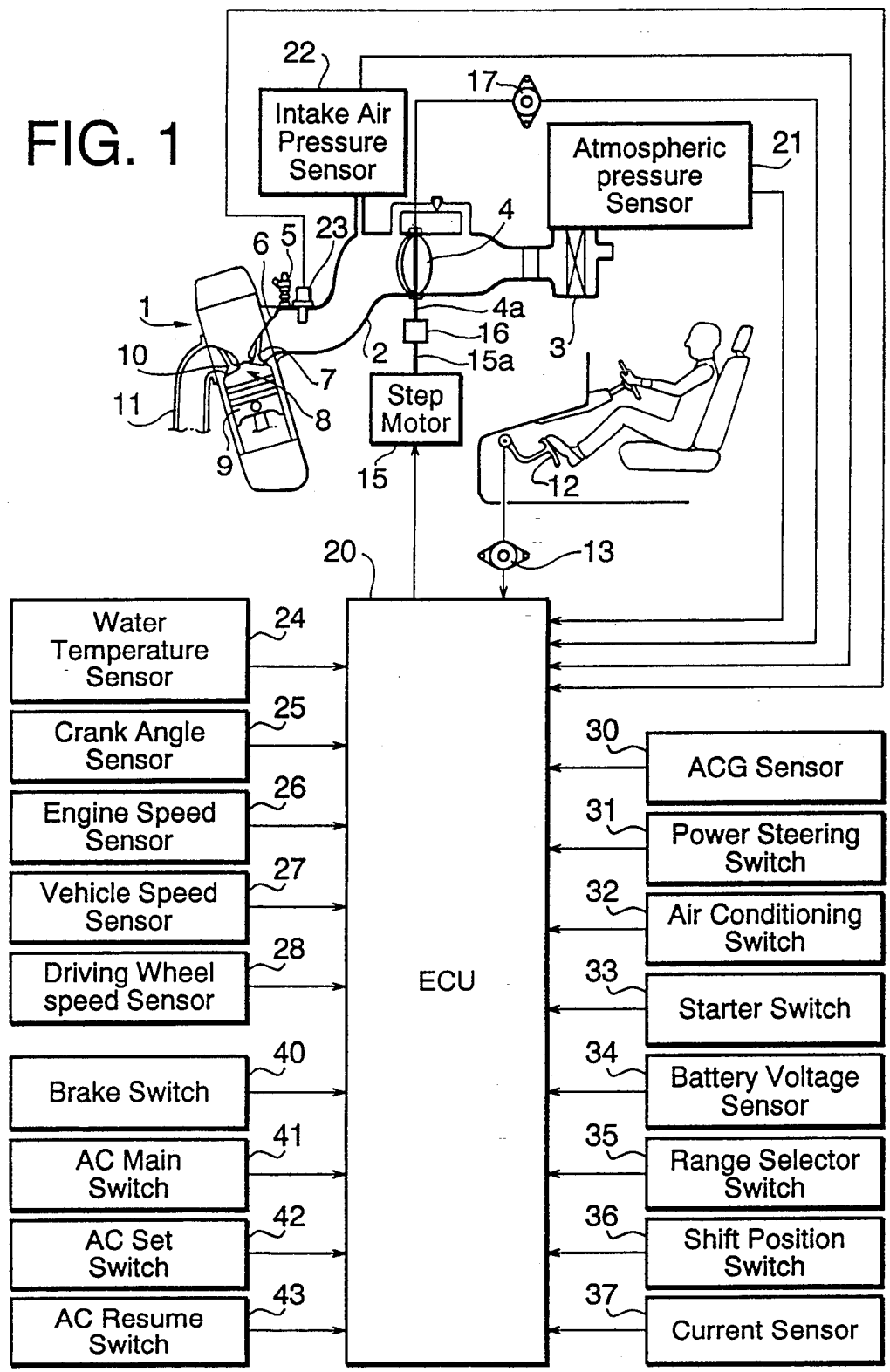
FIG. 1 is a general schematic view showing one embodiment of a fuel supply control device of an internal-combustion engine according to the present invention.

FIG. 1 is a general schematic view showing a fuel supply control device of an internal-combustion engine according to the present invention mounted on a motor vehicle.

An intake air passage 2 for supplying the fuel into an internal-combustion engine 1 has an air cleaner 3 mounted on the upstream end thereof, a throttle valve 4 mounted on the way thereof to open and close the air passage 2, and a fuel injection valve 5 installed on the downstream side; the air drawn into the intake air passage 2 through the air cleaner 3 flows through the throttle valve 4 by which the quantity of the air is controlled. The air then goes into an intake manifold 6, through which the air, together with the fuel injected from the fuel injection valve 5, flows as an air-fuel mixture into a combustion chamber 8 via an intake port which is opened and closed by means of an intake valve 7.

The air-fuel mixture that has flowed into the combustion chamber 8 burns to drive a piston 9, then passes through an exhaust port which is opened and closed by an exhaust valve 10, being discharged out of the engine through an exhaust manifold 11 and an exhaust air passage.

On the cab floor of the vehicle mounted with the internal-combustion engine 1 is installed an accelerator pedal 12, which is set in an idle position by means of a spring and is tilted down when depressed by a driver.

As shown in FIG. 1, the accelerator pedal 12 and the throttle valve 4 are not mechanically connected. The amount of depression of the accelerator pedal 12 is detected by an accelerator sensor 13 consisting of a potentiometer mounted on a rocking shaft of the accelerator pedal 12. The throttle valve 4 is operated to open and close by a step motor 15, which is designed to operate in accordance with a driving signal from an ECU 20.

A driving shaft 15a of the step motor 15 is mounted on the same axis as a valve shaft 4a of the throttle valve 4 and connected directly by a coupling 16, not via a speed changing connector such as a gear.

Angles of normal and reverse rotation of the step motor 15 become the open and close angles of the throttle valve 4. The open and close angles of the throttle valve 4 are detected by a throttle sensor 17 consisting of a potentiometer, and signals of detected angles will then be inputted into the ECU 20.

On the upstream side in the intake air passage 2 is installed an atmospheric pressure sensor 21. On the downstream side of the throttle valve 4 is installed an intake pressure sensor 22 which detects the absolute pressure of the intake air, and on the further downstream side is installed an intake air temperature sensor 23 which detects intake air temperatures.

In an appropriate position near the combustion chamber 8 of the internal-combustion engine 1 is installed a water temperature sensor 24 which detects cooling water temperature; inside a distributor is installed a crank angle sensor 25; and an engine speed sensor 26, a vehicle speed sensor 27, and a driving wheel speed sensor 28 are installed in appropriate position.

A detection signal from each of the above-mentioned sensors is inputted into the ECU 20.

Further installed in this control device are an ACG sensor 30 for detecting the field current of an alternator, a power steering switch 31 for detecting the operation of the power steering system, an air-conditioning switch 32 for detecting the operation of the air conditioner, a starter switch 33 for detecting the operation of a starter, a battery voltage sensor 34 for detecting a battery voltage, a range selector switch 35 for detecting the range position of a shift lever, and a shift position switch 36 for detecting a shift position. All these switches and sensors output a detection signal to the ECU 20. On a main battery cable extending from the battery is installed a current sensor 37 consisting of a Hall element to detect an electric load, outputting a detection signal to the ECU 20.

Furthermore, mounted for auto cruise (AC) control are a brake switch 40, an AC main switch 41, an AC set switch 42, and an AC resume switch 43.

Figure 2:
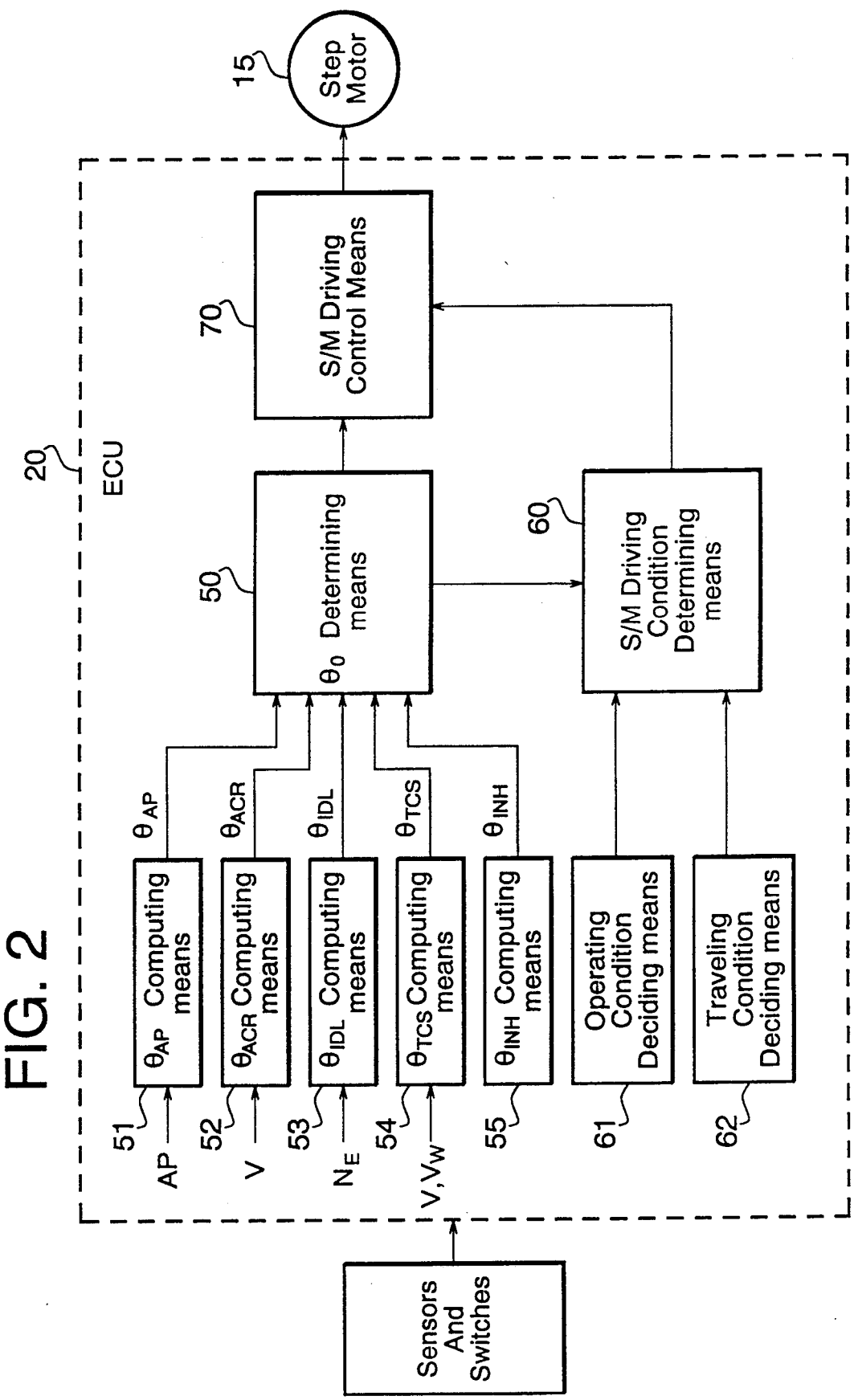
FIG. 2 is a block diagram of a control system of the same device.

FIG. 2 shows the schematic constitution of the control system which controls the step motor 15 for operating the throttle valve 4 in accordance with signals from these sensors and switches described above.

First, a throttle opening required from various situations in a process for determining a final target throttle opening $\theta_O$ of the throttle valve 4 is calculated.

That is, the ECU 20 has five or more computing means including a $\theta_{AP}$ computing means 51 which computes a normal throttle opening $\theta_{AP}$ in accordance with the amount of depression AP of the accelerator pedal 12 fed from the accelerator sensor 13, a $\theta_{ACR}$ computing means 52 which computes, on the basis of a brake switch 40 and so forth, the throttle opening $\theta_{ACR}$ during auto cruise in accordance with a vehicle speed V supplied by the vehicle speed sensor 27, a $\theta_{IDL}$ computing means 53 which computes the throttle opening $\theta_{IDL}$ during idling in accordance with an engine speed $N_E$ supplied by the engine speed sensor 26, a $\theta_{TCS}$ computing means 54 which computes a throttle opening $\theta_{TCS}$ during traction control in accordance with a vehicle speed V and a driving wheel speed $V_W$ supplied by the driving wheel speed sensor 28, and a $\theta_{INH}$ computing means 55 for computing the throttle opening $\theta_{INH}$ during restriction of engine output for the purpose of prevention of engine breakage. The final target throttle opening $\theta_O$ is determined, by a target throttle opening $\theta_O$ determining means 50, from the throttle openings $\theta_{AP}$, $\theta_{ACR}$, $\theta_{IDL}$, $\theta_{TCS}$, and $\theta_{INH}$.

Furthermore, the ECU 20 has an operating condition decision means 61 for deciding the operating condition of the vehicle in accordance with signals supplied by various sensors and switches mounted, and a traveling condition decision means 62 for deciding the traveling condition of the vehicle; a S/M driving condition determining means 60 determines driving conditions, relative to the target throttle opening $\theta_O$, for driving the step motor 15 on the basis of a result of decisions by these decision means 61 and 62.

A S/M drive control means 70 controls the drive of the step motor 15 in order to set throttle valve 4 to the target throttle opening $\theta_O$ under the driving conditions determined by the S/M driving condition determining means 60.

This step motor is a hybrid four-phase stepping motor, and is driven by a two-phase excitation driving system.

This step motor 15 is capable of high-resolution micro-step driving without mechanical speed reduction in addition to common two-phase driving, using software for proper use of the two driving modes: the two-phase mode and the micro-step mode.

In the case of the two-phase mode, the common driving system supplies the same driving current to adjacent excitation phases, turning the throttle valve by 1.8 degrees per step in the present example.

On the other hand, in the driving system of the micro-step mode, the driving current of different duty is supplied to adjacent exciting phases. In this micro-step mode the angle of rotation, 1.8 degrees per step, of the throttle valve is further divided by a duty ratio to a smaller angle as the amount of skip per step. In this example, 1.8 degrees is subdivided into 16 divisions 0.11 degrees per step as a unit amount of skip, and is further subdivisible.

The rotational speed of the step motor 15 is proportional to a driving frequency f (pps).

When the driving frequency f is large, the rotational speed is fast, providing a good responsibility. The driving torque, however, becomes little.

Reversely, when the driving frequency f is small, the responsibility becomes deteriorated, but the driving torque increases.

In the present embodiment, two kinds of driving frequencies f of 600 pps ($TM_{OL}$) and 400 pps ($TM_{OH}$) are used. The driving frequency may be further divided in accordance with a rotational speed required and a driving torque required.

The throttle opening and the rotational angle, being digitally processed by a computer, is represented in terms of the number of steps by the hexadecimal number system, using a 10-bit memory.

The last four digits (the last one digit in the hexadeciamal number system) of the 10 bits correspond to the micro-step mode, and the higher digits correspond to the two-phase mode.

Therefore, $10_H$ in the hexadecimal number system ($H$ denotes the hexadecimal number system) indicates the rotational angle of 1.8 degrees per step of two-phase mode; an angle to $OF_H$ of $01_H$ unit of the 16 divisions corresponds to one step of the micro-step mode.

There are four kinds of combinations of excitation phases: 4th phase and 1st phase, 1st phase and 2nd phase, 2nd phase and 3rd phase, and 3rd phase and 4th phase, for each of which 16 duty patterns are present; therefore there exist 64 kinds of excitation patterns in total. The number of steps which is less than $40_H$ corresponds to each of the 64 kinds of excitation patterns.

In the meantime, the drive of the step motor 15 in the two-phase mode is controlled by the use of a chopper. A chopping duty is changed between "drive" and "hold" in the operation of the throttle valve; the value of hold duty $D_{HLD}$ Of the latter is smaller than that of the driving duty $D_{MOV}$ of the former.

Hereinafter, the procedure of drive control of the step motor 15 will be explained in accordance with the flowcharts given in FIGS. 3 to 8. In these figures, "out of phase" is indicated as "step-out".

Figure 5:
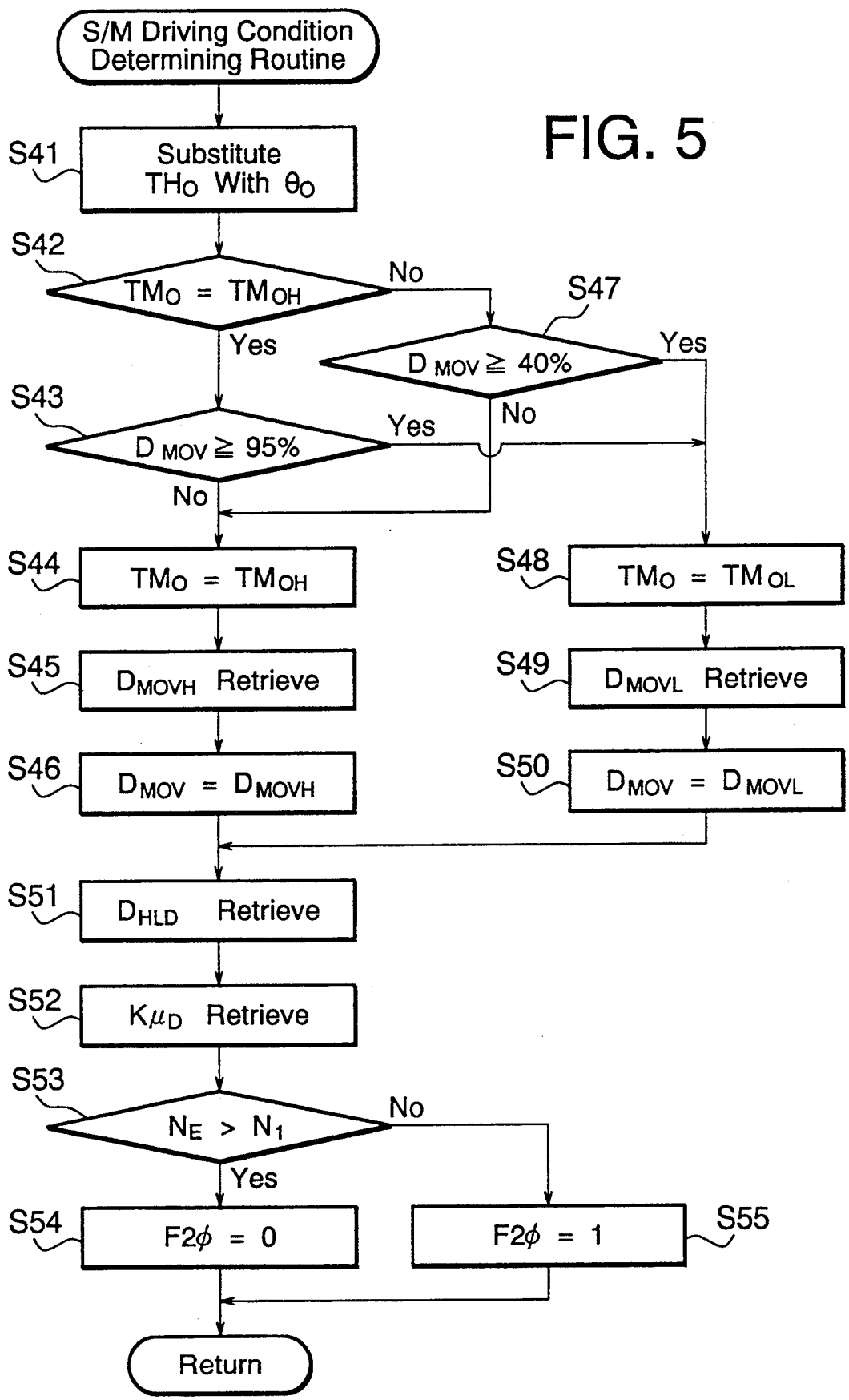
FIG. 5 is a flowchart showing a routine for determining step motor driving conditions.
Figure 6A:
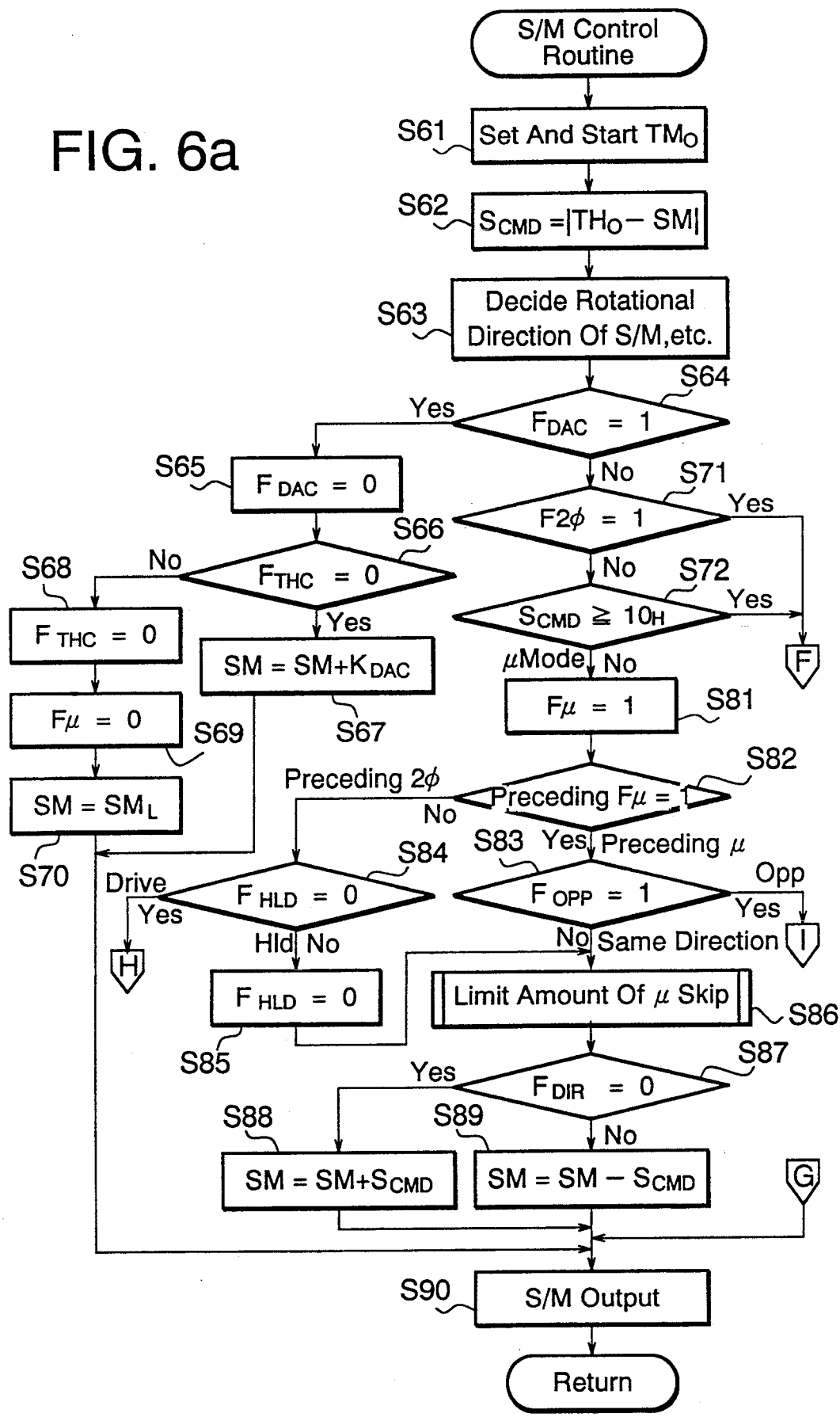
FIGS. 6a and 6b are flowcharts showing a step motor control routine.
Figure 6B:
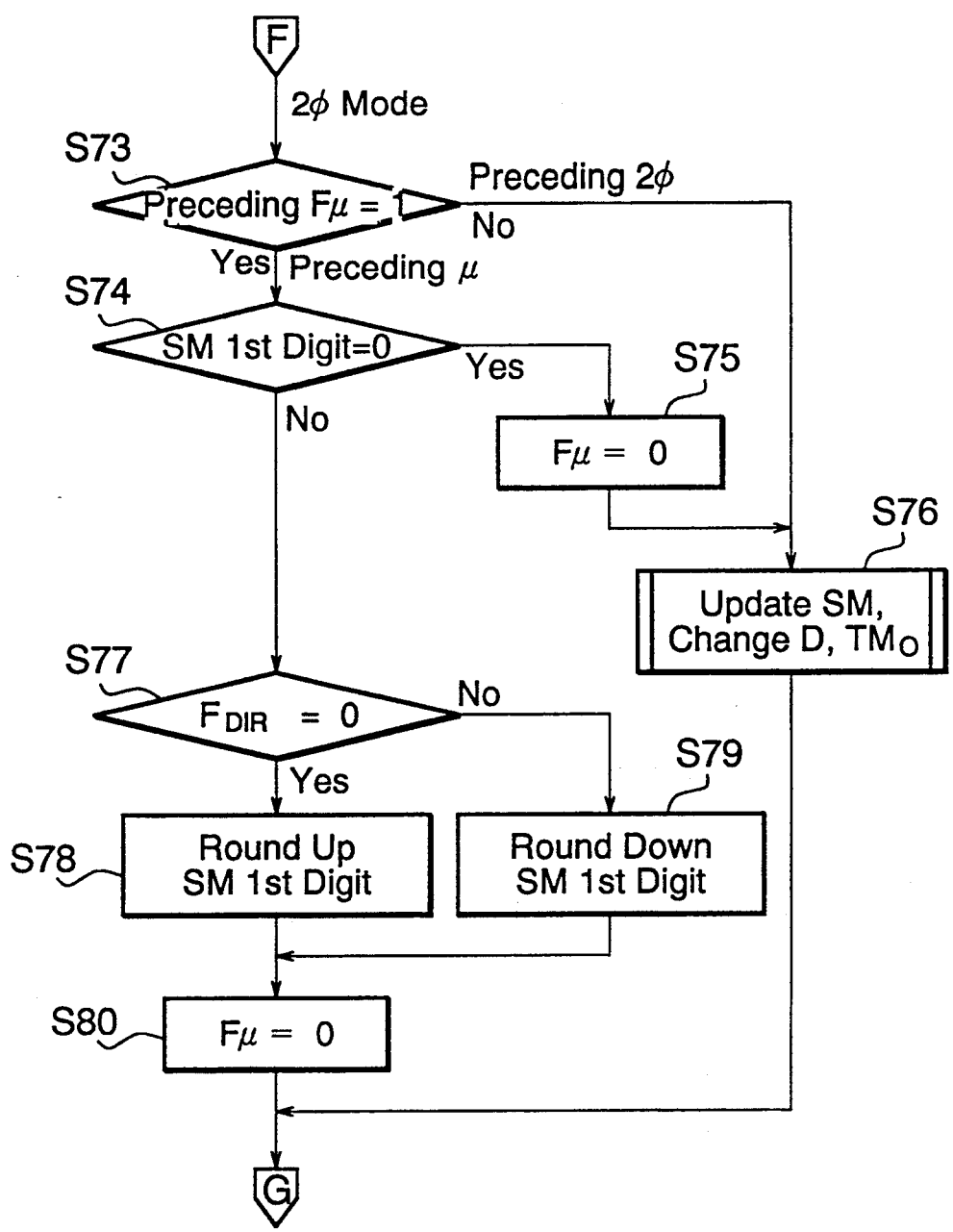
Figure 7:
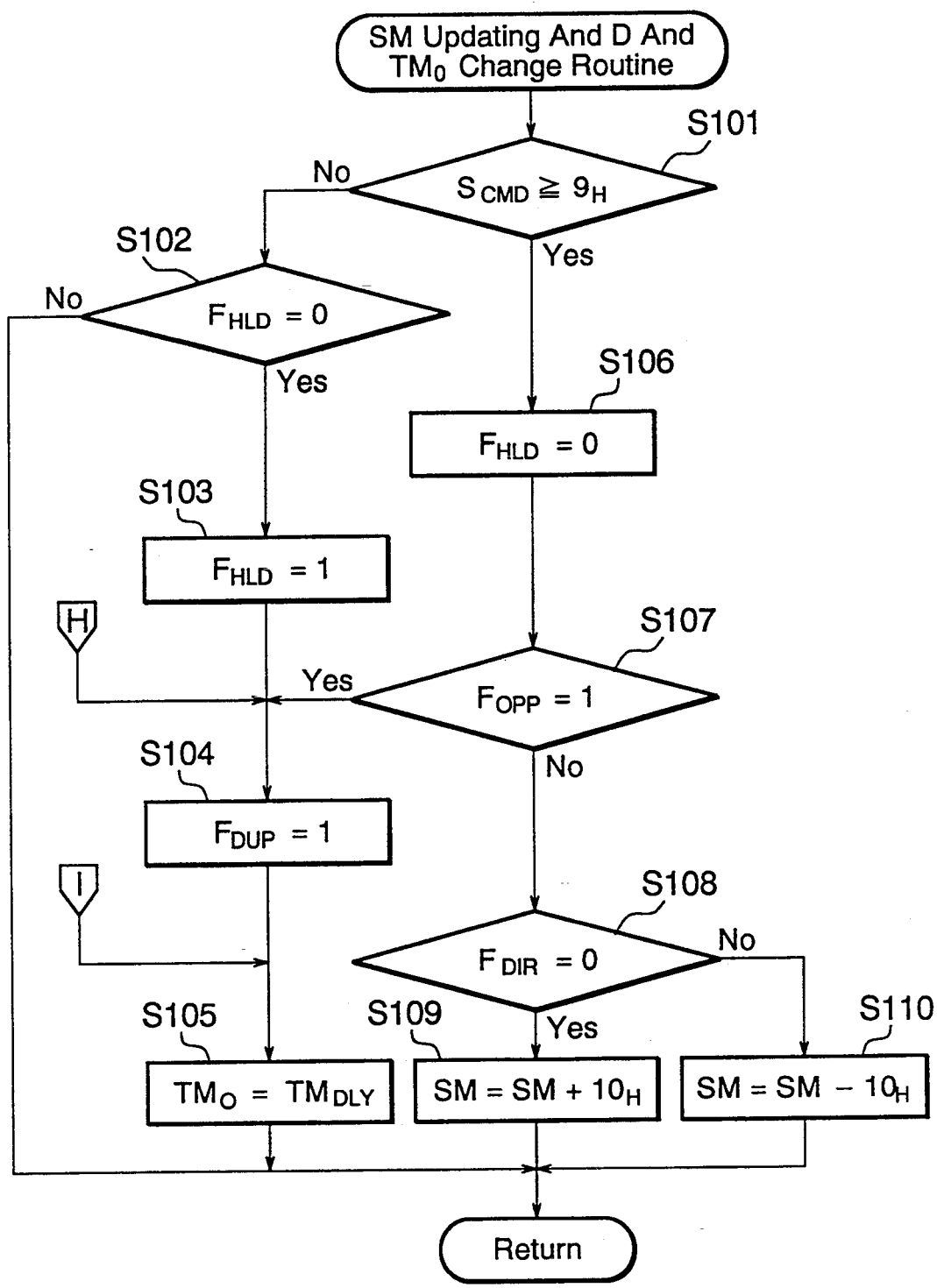
FIG. 7 is a flowchart showing routines for updating SM and for modifying D and $TM_O$.
Figure 8:
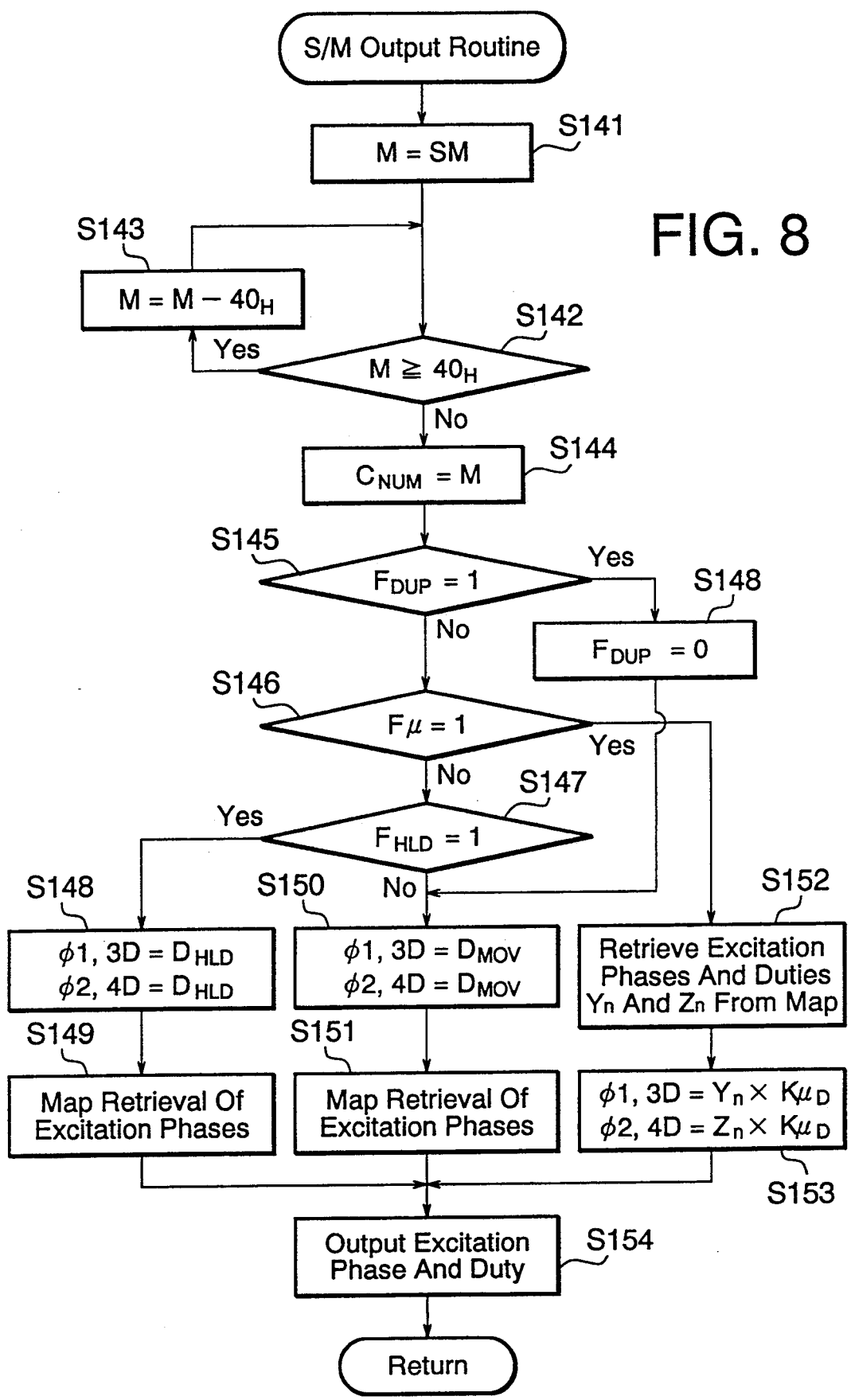
FIG. 8 is a flowchart showing a step motor output routine.

The flowcharts may be classified by routines into two kinds: a routine for setting the driving conditions of the step motor 15 (a main routine in FIG. 3, and subroutines in FIGS. 4 and 5), and a routine for actually controlling the step motor 15 (a main routine in FIG. 6, and subroutines in FIGS. 7 and 8).

Figure 3:
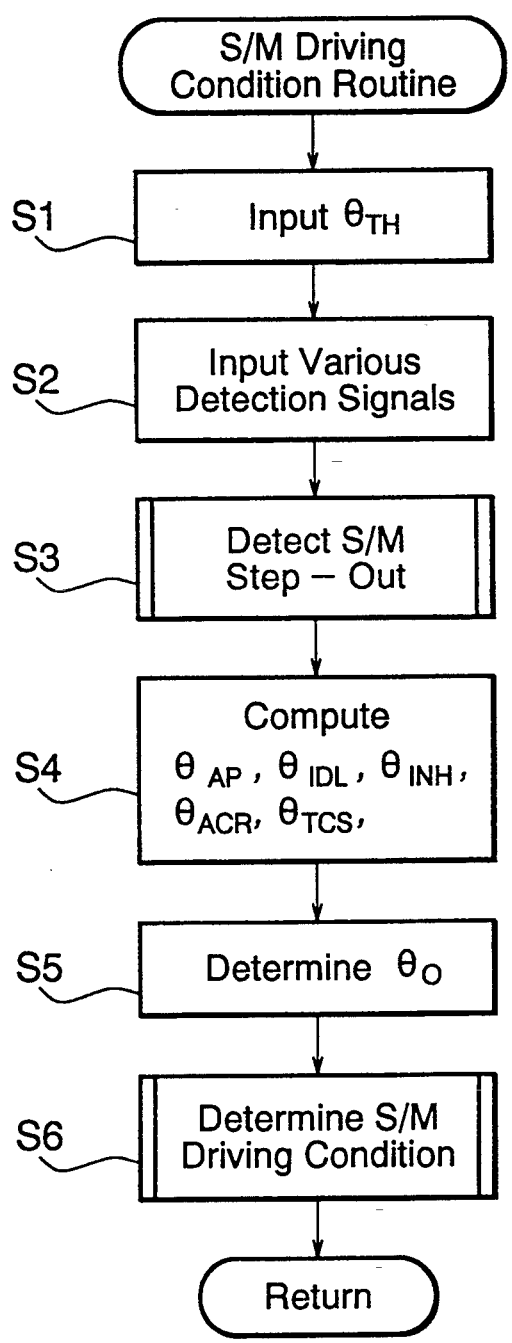
FIG. 3 is a flowchart showing a routine control procedure for the control of a step motor driving condition in the same control system.

The step motor driving condition routine in FIG. 3 is executed by 10 msec interrruption, first reading the throttle opening $\theta_{TH}$ (Step 1) that has been detected by the throttle sensor 17 and also reading a detection information of each sensor such as the amount of depression AP detected by the accelerator sensor 13 (Step 2).

Then, the routine proceeds to Step 3, where the step-out of the step motor 15 is detected.

The out of phase of the step motor is meant by the out-of-step condition that there exists a difference between an actual motor position and a current position stored by the step motor control system when the step motor is controlled by an open-loop control system. Usually the difference appears as a positional difference in the same excitation phase.

In the present embodiment, the out of phase is decided when a specific value has been exceeded by a difference between the current throttle opening SM stored in the throttle valve 4 control system and the throttle opening TH (a value of $\theta_{TH}$ expressed in terms of the number of steps) based on the throttle sensor 17.

Figure 4A:
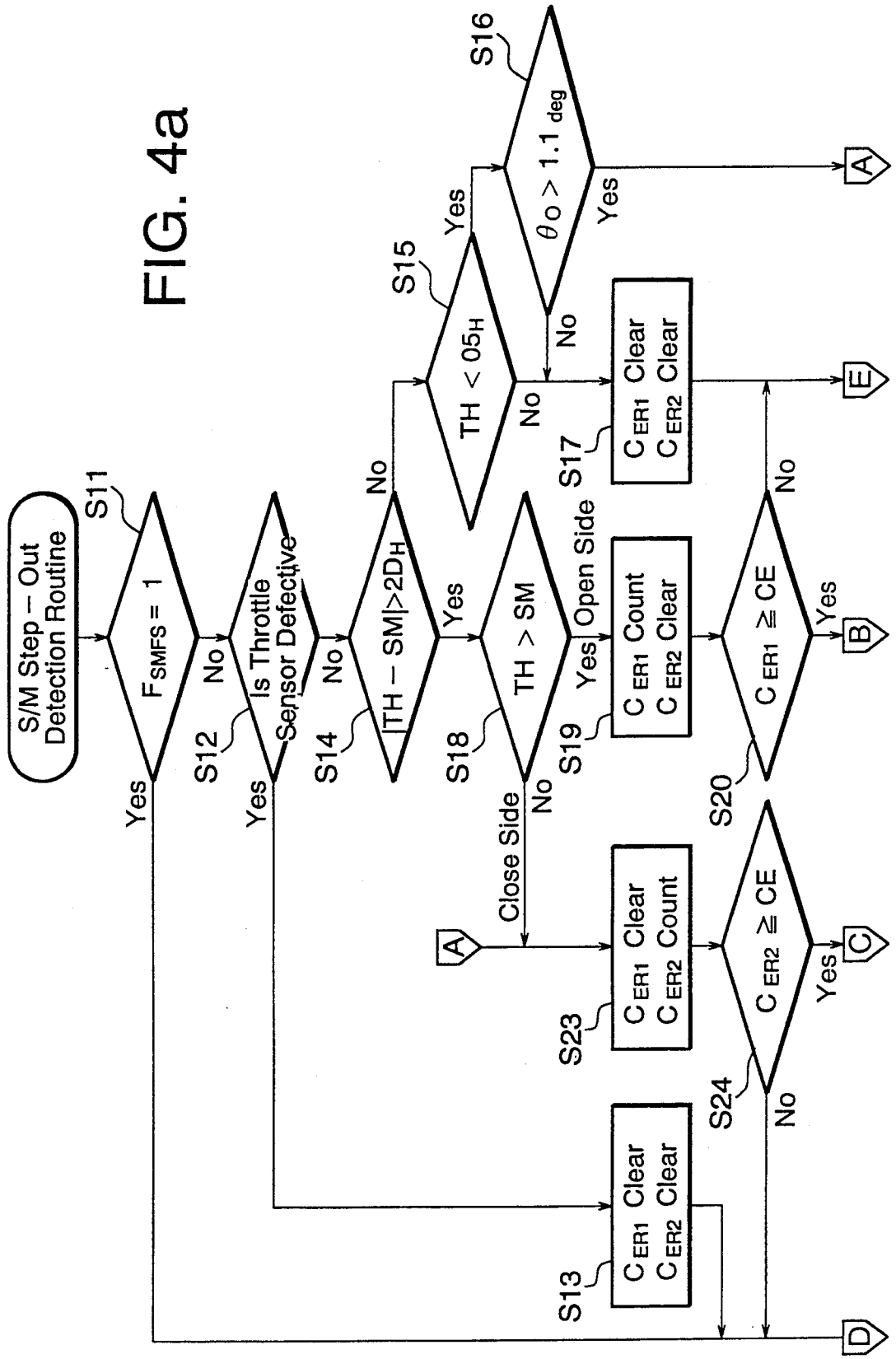
FIGS. 4a and 4b are flowcharts showing an out of phase detecting routine.
Figure 4B:
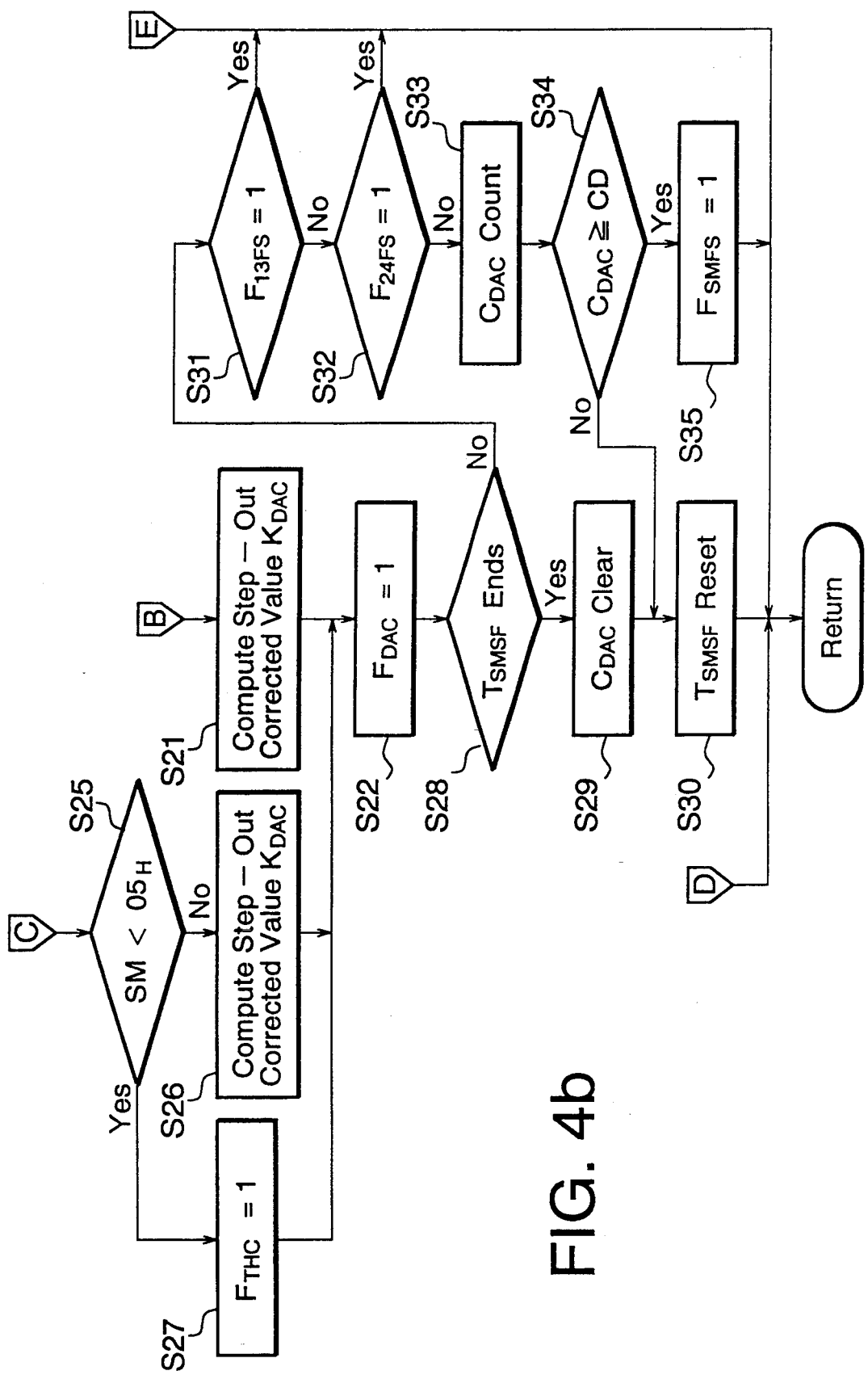

This out of phase detection routine is a subroutine shown in FIG. 4, which will be described later. Here, in FIG. 3, the flow proceeds to the following Step 4, where each of the above-described target throttle openings $\theta_{AP}$, $\theta_{IDL}$, $\theta_{INH}$, $\theta_{ACR}$, and $\theta_{TCS}$ will be computed.

At the next Step 5, the final target throttle opening $\theta_O$ will be determined by the target throttle opening $\theta_O$ determining means 50 from the five kinds of throttle openings $\theta_{AP}$, $\theta_{IDL}$, $\theta_{INH}$, $\theta_{ACR}$, and $\theta_{TCS}$ thus calculated.

The $\theta_{ACR}$ computing means 52 operates to fully close the throttle valve except during auto cruise; the $\theta_{TCS}$ computing means 54 operates to fully open the throttle valve except during traction control; and the $\theta_{INH}$ computing means 55 operates to fully open the throttle valve except during output limiting.

At the next Step 8, the step motor driving conditions are determined on the basis of the target throttle opening $\theta_O$, thus ending the routine.

Next, the detection of the out-of-phase conditions of the step motor at Step 3 will be explained in accordance with the subroutine in FIG. 4.

First, it is discriminated whether or not the flag $F_{SMFS}$ indicating abnormality of the step motor 15 itself is "1". When the flag $F_{SMFS}=1$, that is, when the step motor 15 has an abnormality, no out of phase detection through this routine will be executed; when the step motor 15 has no abnormality ($F_{SMFS}=0$), the flow will proceed to the next Step 12, where whether or not the throttle sensor 17 has abnormality will be discriminated.

When the throttle sensor has been decided abnormal, the flow will skip to Step 13, thus clearing an out of phase count number $C_{ER1}$ on the open side and an out of phase count number $C_{ER2}$ on the close side to go out of this routine.

When the throttle sensor has no abnormality, the flow will proceed to the next Step 14, where it is discriminated whether or not the absolute value $|TH-SM|$ of a deviation between the throttle opening TH detected by the throttle sensor 17 and the current throttle opening SM stored in the control system exceeds $2D_H$.

When $2D_H$ is not exceeded, little probability of out of phase will be determined and the flow will proceed to Step 15, where whether or not the throttle opening TH based on the throttle sensor 17 exceeds $05_H$ is discriminated. When the throttle opening TH exceeds $05_H$, the step motor is operating normally. The flow will proceed to Step 17 to clear the out of phase count numbers $C_{ER1}$ and $C_{ER2}$, thus going out of this routine.

When the throttle opening TH is under $05_H$, the flow will proceed to Step 16, where it is discriminated whether or not the target throttle opening $\theta_O$ exceeds 1.1 degrees. When the 1.1 degrees is not exceeded, the step motor is normally operating without the out of phase. In this case, the flow will proceed to Step 17; when the 1.1 degrees is exceeded, the flow will jump to Step 23 for processing the out of phase on the close side described later.

On the other hand, when $|TH-SM|>2D_H$, the flow will proceed to Step 18 because of the probability of occurrence of out of phase. At Step 18, the throttle opening TH from the throttle sensor 17 and the throttle opening SM stored are compared, and when the throttle opening TH is lager than the throttle opening SM, the step motor will step out on the open side. The flow will proceed to Step 19, where the out of phase count number $C_{ER1}$ on the open side will be further stepped, while the out of phase count number $C_{ER2}$ on the close side will be cleared. At Step 20, it is discriminated whether or not the out of phase count number $C_{ER1}$ on the open side has exceeded a out of phase decision threshold value CE. When the threshold value CE is not satisfied, the flow will go out of this routine. When the threshold value CE is exceeded, the flow will proceed to Step 21 to calculate an out of phase correction Value $K_{DAC}$, then proceeding to Step 22, where "1" will be set up at an out of phase flag $F_{DAC}$.

Here the out of phase correction value should be intergral multiple of $40_H$ which is the closest value to TH−SM.

When, at Step 18, TH is smaller than SM, the flow will proceed to Step 23 because of the probability of occurrence of out of phase on the close side. At step 23, the out of phase count number $C_{ER1}$ on the open side is cleared, while the out of phase count number $C_{ER2}$ on the close side is further stepped. At Step 24, it is discriminated whether or not the out of phase count number $C_{ER2}$ on the close side exceeds the out of phase decision threshold value CE. When the out of phase count number $C_{ER2}$ is under the threshold value CE, the flow will go out of this routine from Step 24. When the threshold value CE is exceeded, whether or not the throttle opening SM stored is under $05_H$. When the throttle opening SM exceeds $05_H$, the flow will proceed to Step 26, where the out of phase correction value $K_{DAC}$ will be calculated similarly as in Step 21. At Step 22, "1" will be set up at the out of phase flag $F_{DAC}$. Also when the stored throttle opening SM is under $05_H$, the step motor is out of phase with the throttle valve 4 in the fully-closed condition, and therefore "1" will be set up at the full-close out of phase flag $F_{THC}$, and further the flow will proceed to Step 22, where "1" will be set up at the out of phase flag $F_{DAC}$.

At Step 22, after "1" is set up at the out of phase flag $F_{DAC}$, judgment is made on whether or not the timing period of the step motor abnormality decision timer $T_{SMSF}$ has ended. At the beginning, supposing that the timing period of the timer $T_{SMSF}$ is ended, the flow proceeds to Step 29, clearing the out of phase occurrence frequency count number $C_{DAC}$ and resetting a step motor abnormality decision timer $T_{SMSF}$(Step 30).

After the step motor abnormality decision timer $T_{SMSF}$ is reset and started, the flow will jump from Step 28 to Step 31 when the step motor steps out again until the end of the timer $T_{SMSF}$, then judgment will be made of whether or not 1st and 3rd phases of excitation phases of the step motor 15 have abnormality (1st- and 3rd-phase abnormality flag $F_{13FS}$), and further, at Step 32, judgment will be made of whether or not the 2nd and 4th phases have abnormality (2nd and 4th abnormality flag $F_{24FS}$). When there exists abnormality with either one with "1" set up at the flag $F_{13FS}$ or $F_{24FS}$, the flow will go out of this routine. When there exists no abnormality, the flow will proceed to Step 33, at which the out of phase occurrence frequency count number $C_{DAC}$ is further stepped. At step 34, whether or not this out of phase occurrence frequency count number $C_{DAC}$ exceeds the step motor abnormality decision threshold value CD is discriminated. When the threshold value CD is not reached yet, the flow will skip to Step 30, at which the step motor abnormality decision timer $T_{SMSF}$ will be reset to check to see when the out of phase occurs whithin $T_{SMSF}$ again. When the out of phase still occurs, the flow will proceed from Step 28 to Step 31 to further step the out of phase occurence frequency count number $C_{DAC}$. When the out of phase still continues to occur even after the repetition of the above procedure until the out of phase occurrence frequency count number $C_{DAC}$ exceeds the threshold value CD, the flow will proceed from Step 34 to Step 35, setting up "1" at the step motor abnormality flag $F_{SMSF}$.

When $F_{SMSF}=1$, the flow will go out of this routine at Step 11 stated above.

Above described is the step-motor out of phase detection routine, which corresponds to Step 5 in FIG. 3.

Next, the step-motor driving condition decision routine of Step 6 in FIG. 3 will be explained by referring to the flowchart in FIG. 5.

The target throttle opening Go decided at Step 5 is converted to the number of steps $TH_O$ of the step motor 15 (Step 41), then the flow proceeds to Step 42.

At Step 42, it is discriminated whether or not the current step motor driving frequency $TM_O$ (the interruption timer set value of step motor drive control) is as high as 600 pps ($TM_{OH}$). When $TM_O=TM_{OH}$, whether or not the current driving duty $D_{MOV}$ is 95% or more is discriminated at Step 43. When it is less than 95%, a high driving frequency $TM_{OH}$ of 600 pps will be set at Step 44. Also, when $D_{MOV}$ is 95% or more, the flow proceeds to step 48, at which a low driving frequency $TM_{OL}$ of 400 pps will be set as the driving frequency $TM_O$.

In the meantime, at Step 42, when the current driving frequency $TM_O$ is not $TM_{OH}$, that is, in the case of $TM_{OL}$, the flow will proceed to Step 47, where it is discriminated whether or not the driving duty $D_{MOV}$ is 40% or more. When the driving duty is less than 40%, the flow will proceed to Step 44, where a high driving frequency $TM_{OH}$ of 600 pps is set as the driving frequency $TM_O$. When it is 40% or more, the flow will proceed to Step 48, where a low driving frequency $TM_{OL}$ of 400 pps will be reset as the driving frequency $TM_O$.

When the driving frequency $TM_O$ is the high driving frequency $TM_{OH}$ (600 pps), since the step motor 15 is liable to be influenced by power supply voltage fluctuation resulting from a change in electrical loads when the driving duty $D_{MOV}$ is 95% or more, it is possible to obtain a sufficient driving torque requied to properly drive the step motor 15, by lowering the driving frequency to the low $TM_{OL}$ (400 pps).

Reversely, when the driving frequency $TM_O$ is the low driving frequency $TM_{OL}$ (400 pps) and the driving duty $D_{MOV}$ is under 40%, it is possible to improve responsibility while maintaining the sufficient driving torque, by increasing the driving frequency to the high $TM_{OH}$ (600 pps).

When, the high driving frequency $TM_{OH}$ is set at step 44, the driving duty table for $TM_{OH}$ will be retrieved at Step 45, to thereby select $D_{MOVH}$ in accordance with the battery voltage $V_B$. Then $D_{MOVH}$ will be set to the driving duty $D_{MOV}$ (Step 46).

Furthermore, when the low driving frequency $TM_{OL}$ is set to the driving frequency $TM_O$ at Step 48, the driving duty table for $TM_{OL}$ will be retrieved at Step 49, thereby selecting $D_{MOVL}$ in accordance with the battery voltage $V_B$ and setting $D_{MOVL}$ to the driving duty $D_{MOV}$ (Step 50).

Subsequently to the setting of the driving duty $D_{MOV}$, the hold duty $D_{HLD}$ will be retrieved from hold duty table in accordance with the battery voltage $V_B$ at Step 51.

Furthermore, at Step 52, a duty correction coefficient $K_{\mu D}$ based on the battery voltage $V_B$ will be retrieved from the table.

Four step motor driving conditions: the driving frequency $TM_O$, the driving duty $D_{MOV}$, the hold duty $D_{HLD}$, and the duty correction coefficient $K_{\mu D}$, are determined by this routine as described above.

Next, at Step 53, whether or not the engine speed $N_E$ is less than a specified speed $N_1$ will be discriminated. When the engine speed $N_E$ exceeds $N_1$; a forced two-phase flag $F2\Phi$ will be set at "0" (step 54); and when $N_1$ is not exceeded, the flow proceeds to Step 55, where "1" will be set to the forced two-phase flag $F2\Phi$, thus indicating forced two-phase drive.

That is, the step motor is driven by the forced two-phase drive for the purpose of reducing current consumption until the engine is fully started at an engine speed of less than a specific value. To indicate this two-phase drive, "1" will be set up at the forced two-phase flag $F2\Phi$.

Next, a procedure for actually controlling the drive of the step motor 15 under the thus set conditions will be explained with reference to FIGS. 6 to 8.

First, in the main routine of step motor control shown in FIG. 6, at Step 61, the previously set driving frequency $TM_O$ will be set, and thereafter this routine will be performed at an interruption cycle based on the driving frequency $TM_O$.

At Step 62, the absolute value of a difference between the number of steps $TH_O$ of the target throttle opening and the number of steps SM of the current throttle opening stored is used as a target number of steps $S_{CMD}$, and subsequently at Step 63 the direction of rotation of the step motor 15 will be determined.

That is, the following flags are set: a rotational direction flag $F_{DIR}$ indicating the direction of rotation to either of the open and close sides of the step motor 15, an opposite rotation flag $F_{OPP}$ indicating the reverse direction of rotation, and a hold flag $F_{HLD}$.

Next, at Step 64, judgment is made on the state of the out of phase flag $F_{DAC}$; when "1" is present, the flow will proceed to step 65. Then after the out of phase flag $F_{DAC}$ is set to "0", the state of the full-close out of phase flag $F_{THC}$ will be determined (Step 66). Also, when "0", the flow will proceed to Step 67, where the out of phase correction value $K_{DAC}$ calculated out at Steps 21 and 26 will be added to the stored throttle opening SM to obtain a new stored throttle opening SM, to thereby correct the out of phase by the compensation of the stored throttle opening SM, and then the flow will jump to step 90.

At Step 66, when "1" has been set up at the full-close out of phase flag $F_{THC}$, the flow will proceed to Step 68, at which the full-close out of phase flag $F_{THC}$ will be set to "0" and further the micro-step flag $F_\mu$ will also be set to "0" (Step 69). Subsequently, the stored throttle opening SM will be set to the lower limit value $SM_L$ to perform the out of phase correction by the compensation of the stored throttle opening SM. Then the flow will skip to Step 90.

That is, with the stored throttle opening SM compensated, the step motor 15 will then be driven and controlled to turn the throttle valve to the target opening, to thereby enable recovery from the out-of-phase condition within a short period of time, giving no effect to the step motor control hereafter.

Therefore there is no necessity to provide the motor with a large torque margin for the purpose of out-of-phase prevention, and the out of phase correction can be done reliably within a short time through open-loop control.

In the meantime, when $F_{DAC}=0$ at Step 64, the step motor is not out of phase; the flow, therefore, will proceed to Step 71, where it is discriminated whether or not "1" is present at the forced two-phase flag $F2\Phi$. When "1" is present, the flow will proceed to Step 73. When $F2\Phi=0$, the flow will proceed to Step 72, where whether or not the target number of steps $S_{CMD}$ is $10_H$ or more is discriminated.

When the target number of steps $S_{CMD}$ is $10_H$ or more, the flow will proceed to Step 73. When the target number is under $10_H$, the flow will proceed to Step 81.

That is, in the present routine, the flow proceeds to Step 73 in the case of the two-phase mode. When "1" is present at the forced two-phase flag $F2\Phi$ or when the target number of steps exceeds $10_H$, the flow proceeds to Step 73. Reversely, when $F2\Phi=0$ and $S_{CMD}<10_H$, the flow proceeds to Step 81 to drive the step motor in the micro-step mode.

When the flow proceeds to Step 73 because of the two-phase mode, whether or not the micro-step mode was used at the preceding step is discriminated by the micro-step flag $F_\mu$. When $F_\mu=0$ and not in the micro-step mode and when the preceding mode is the two-phase mode, the flow will proceed to the subroutine at Step 76, at which the updating of the stored throttle opening SM and a change in the duty D and the driving frequency $TM_O$ will be executed.

Also when the preceding mode is the micro-step mode ($F_\mu=1$), the flow will proceed to Step 74, at which it is discriminated whether or not the first digit of the stored throttle opening SM is $0_H$ in the hexadecimal number system. When the first digit is $0_H$, the micro-step flag $F_\mu$ will be set up at "0" (Step 75), and the subroutine of Step 76 will be executed.

In the subroutine at Step 76 shown in FIG. 7, first it is discriminated whether or not the target number of steps $S_{CMD}$ is $9_H$ or more (Step 101); when the target number of steps is under $9_H$, the step motor requires no two-phase drive and may be held in the hold state, and accordingly the flow will proceed to Step 102, at which whether or not the step motor was in the hold state will be discriminated from the hold flag $F_{HLD}$. When the preceding state is the hold state ($F_{HLD}=1$), the flow will go out of the present subroutine while holding the preceding state. When the preceding state is the drive state ($F_{HLD}=0$), the flow will proceed to Step 103, where the hold flag $F_{HLD}=1$, and the current drive state will transfer to the hold state. Therefore, "1" will be set at the duty up flag $F_{DUP}$ (Step 104) to indicate a greater duty, to thereby increase duty to increase the holding power. Furthermore the driving frequency $TM_O$ will be set to a long period of $TM_{DLY}$ (about 100 pps) (Step 105) to prohibit a subsequent interruption for a specific period of time, thereby restraining vibration likely to occur during transfer from the drive state to the hold state so that the step motor will enter a rapid, stabilized hold state.

In the meantime, at Step 101, when the step motor should be driven with the target number of steps of $9_H$ or more, the flow will proceed to step 106, where the hold flag $F_{HLD}$ is set to 0; and at Step 107 it is discriminated whether or not "1" is set up at the opposite turn flag $F_{OPP}$. In the case of opposite turn ($F_{OPP}=1$), the flow will jump to Step 104 to set up "1" at the duty up flag $F_{DUP}$, and $TM_{DLY}$ will be set up at the driving frequency $TM_O$, thereby preventing vibration and out-of-phase condition likely to occur when the direction of rotation of the step motor 15 is reversed, by maintaining a high holding power and prohibiting a subsequent interruption for a specific period of time.

In the meantime, at Step 107, when the direction of rotation of the step motor 15 is not reversed with the opposite turn flag $F_{OPP}=0$, the flow will proceed to step 108, at which the state of the rotational direction flag $F_{DIR}$ will be discriminated. To turn the step on the open side ($F_{DIR}=0$), $10_H$ (equivalent to 1 step in the two-phase mode) will be added to the stored throttle opening SM to obtain a new stored throttle opening SM (Step 109). Reversely, when the step motor is to be turned on the close side ($F_{DIR}=1$), $10_H$ will be substracted from the stored throttle opening SM to update the stored throttle opening SM (Step 110).

When the preceding mode was the microstep mode and the first digit of the stored throttle opening SM was not $0_H$, the flow proceeds from step 74 to step 77 in the flowchart of FIG 6. At step 77 the state of the rotational direction flag $F_{DIR}$ is discriminated. When the step motor is to be turned to the open side ($F_{DIR}=0$), the first digit of the stored throttle opening SM will be rounded up to determine a new stored throttle opening SM (Step 78). Reversely, when the step motor is to be turned to the close side ($F_{DIR}=1$), the first digit of the stored throttle opening SM will be rounded down to update the stored throttle opening SM (Step 79).

Since the first digit of the stored throttle opening SM is rounded up or down for two-phase driving, the step motor can smoothly shift from the micro-step driving to the two-phase driving without a trouble such as a temporary reverse turn from the target direction to the opposite direction.

From Step 78 or Step 79, the flow will proceed to Step 80, at which the micro-step flag $F_\mu$ is set to "0", thus entering actual output routine (Step 90), together with the subroutine at Step 76, where the power is supplied to the step motor 15 on the basis of the updated stored throttle opening SM.

Above described is the two-phase mode processing. When the mode at Step 71 is not the forced two-phase mode (S2Φ=0) and the target number of steps $F_{CMD}$ is under $10_H$ at Step 72, the flow enters the micro-step mode. At Step 81 "1" is set up at the micro-step flag $F_\mu$, and at Step 82 it is discriminated whether or not the preceding mode is the micro-step mode from the preceding micro-step flag $F_\mu$. When the preceding mode is also the micro-step mode (preceding $F_\mu=1$), the flow will proceed to Step 83, where whther or not the direction of rotation should be reversed will be discriminated from the opposite turn flag $F_{OPP}$. When the direction of rotation is not reversed ($F_{OPP}=0$), the flow will proceed to Step 87. In the case of the reverse turn ($F_{OPP}=1$), that is, when the direction of rotation of the step motor is reversed in the preceding micro-step mode and in the current micro-step mode, the flow will jump to Step 105 of the routine for updating SM in FIG. 7, where the driving frequency $TM_O$ will be set to $TM_{DLY}$, thereby prohibiting a subsequent interruption for a specific period of time (about 10 ms) to restrict vibration and to prevent the out of phase of the step motor.

In the meantime, the flow will proceed to Step 84 when the preceding mode is the two-phase mode at Step 82, and it will be discriminated by the hold flag $F_{HLD}$ whether or not there is a hold instruction. When there is the hold instruction ($F_{HLD}=1$), the flow will proceed to Step 85, at which the hold flag $F_{HLD}$ is set to "0" to cancel the hold state, then the flow will proceed to Step 87.

When the drive instructuion ($F_{HLD}=0$) is given at Step 84 in the preceding two-phase mode ($F_\mu=0$), the flow will jump to Step 104 in FIG. 7, at which "1" will be set up at the duty up flag $F_{DUP}$ and further at Step 105 $TM_{DLY}$ will be set to the driving frequency $TM_O$.

That is, when a change is to be made from the two-phase drive to the micro-step drive, the duty of the current to be supplied to the step motor 15 will be raised and at the same time the next interruption will be prohibited for a specific period, thus restriciting vibration and preventing the out of phase.

At Step 87, the state of the rotational direction flag $F_{DIR}$ will be discriminated. When the step motor is turned to the open side ($F_{DIR}=0$), the flow will proceed to step 88, at which the target number of steps $S_{CMD}$ will be added to the stored throttle opening SM to update the stored throttle opening SM. Reversely when the step motor is turned to the close side ($F_{DIR}=1$), the flow will proceed to Step 89, at which the target number of steps $S_{CMD}$ will be subtracted from the stored throttle opening SM to update the stored throttle opening SM.

After the stored throttle opening SM is updated as described above, the flow will proceed to Step 90, entering the output routine to supply the power to the step motor.

This routine is shown in FIG. 8. First, at Step 141, the updated stored throttle opening SM will be temporarily stored in M, then whether or not this stored value M is $40_H$ and over will be discriminated (Step 142); when stored value exceeds $40_H$, the flow will proceed to Step 143, where $40_H$ will be subtracted from the stored value M to determine a new stored value M, and then the flow will return to Step 142, where it is judged whether or not the stored value M after the subtraction exceeds $40_H$.

Repeating Steps 142 and 143 can obtain the stored value M by the use of a remainder of the division of the initial stored value M by $40_H$. When the remainder is obtained, the flow will proceed from Step 142 to Step 144, and the stored value M of this remainder will be set to the count number $C_{NUM}$ for determining the excitation phase and so forth.

This count number $C_{NUM}$ ranges from $00_H$ to $3F_H$ (0 to 63). The excitation phase of the step motor 15 to be subsequently excited can be determined by effecting map retrieval on the basis of this count number $C_{NUM}$. In the case of the micro-step mode, the duty of adjacent excitation phases also can be determined by the map retrieval.

After the setting of this count number $C_{NUM}$, at Step 145, whether "1" was set up at the duty up flag $F_{DUP}$ at Step 104 (FIG. 7) will be discriminated. When $F_{DUP}=1$, the duty up flag $F_{DUP}$ will be reset to "0" at Step 148, then the flow will jump to Step 150. When $F_{DUP}=0$, whether or not "1" is present at the micro-step flag $F_\mu$ will be discriminated at Step 146. In the case of the micrp-step mode ($F_\mu=1$), the flow will proceed to Step 152, at which the drive control of the micro-step mode will be set; in the case of the two-phase mode ($F_\mu=0$), the flow will proceed to Step 147, where it will be discriminated from the hold flag $F_{HLD}$ whether or not a hold instruction is present. When the hold instruction is present ($F_{HLD}=1$), the flow will proceed to Step 148, where the two-phase hold state will be set. Also in the case of the drive instruction ($F_{HLD}=0$), the flow will proceed to Step 150 to set to the two-phase drive state.

That is, when there is no duty up instruction ($F_{DUP}=0$) and the hold instruction ($F_{HLD}=1$) is present in the two-phase mode ($F_\mu=0$), the flow will proceed to Step 148, where the hold duty value $D_{HLD}$ will be set to the chopping duties $\Phi 1$, 3D and $\Phi 2$, 4D of the excitation current of 1st and 3rd phases and 2nd and 4th phases of the step motor 15, and then at the next Step 149 the excitation phase will be determined by map retrieval on the basis of the count number $C_{NUM}$.

Furthermore, when there is no duty up instruction ($F_{DUP}=0$) but there is the drive instruction ($F_{HLD}=0$) in the two-phase mode ($F_\mu=0$), the flow will proceed to Step 150, where the driving duties value $D_{MOV}$ will be set to the chopping duties $\Phi 1$, 3D and $\Phi 2$, 4D of the 1st and 3rd phase and 2nd and 4th phase excitation current of the step motor 15. At the next Step 151, the excitation phase will be determined by map retrieval on the basis of the count number $C_{NUM}$.

Here the driving duty value $D_{MOV}$ is naturally greater than the hold duty value $D_{HLD}$, and the holding power during holding may be little.

When there has been given the duty up instruction ($F_{DUP}=1$), the flow will skip to Step 150 through Step 148, and therefore a great driving duty value $D_{MOV}$ will be set for the chopping duties $\Phi 1$, 3D and $\Phi 2$, 4D.

That is, when the rotation of the step motor is reversed in the two-phase mode, when a shift is made from a driving to hold state, and when a shift is made from the two-phase driving to the micro-step driving, "1" will be set up at the duty up flag $F_{DUP}$ at Step 104 (FIG. 7) for the purpose of restraining vibration to thereby prevent the out of phase of the step motor. Then, the chopping duty of the excitation current will be set to a great driving duty value $D_{MOV}$.

When there has been given the micro-step mode instruction ($F_\mu=1$), the flow will proceed from Step 146 to Step 152, at which the excitation phase and the duties Yn (1st and 3rd phase duties) and Zn (2nd and 4th phase duties) in the micro-step mode will be map-retrieved on the basis of the count number $C_{NUM}$.

At the next Step 153, the duty correction coefficient $K_{\mu D}$ determined from the battery voltage $V_B$ at Step 53 (FIG. 5) will be multiplied to the duties Yn and Zn, then setting products of this multiplication to the 1st and 3rd phase and 2nd and 4th phase chopping duties $\Phi 1$, 3D and $\Phi 2$, 4D.

After the thus setting of the two-phase drive and micro-step drive excitation phases and the duty of each excitation phase, a drive control signal will be outputted to the step motor 15 at Step 154 to control the drive of the Step motor 15.

According to the present invention, the step motor 15 is controlled as described above. Especially in the event of an out of phase condition, the out of phase will be detected promptly (Steps 14, 20 and 24), an out of phase correction value $K_{DAC}$ will be computted (Steps 21 and 26), and then this $K_{DAC}$ will be added to the stored throttle opening SM, thereby correcting the stored throttle opening SM (Step 67) and correcting the out of phase condition within a short period of time.

Therefore, there is no necessity to set a large margin for the driving torque, and an open-loop control can be performed.

The present embodiment is applicable to the fuel mixture control of the diesel engine through the above-described embodiment pertains to the fuel mixture control of gasoline engines.

According to the present invention, the occurrence of the out of phase will be detected by the out of phase detection means, and a control value correcting means will correct a control value by using the corrected number of steps computed by the out of phase step value computing means; therefore the out of phase correction can be made whithin a short period of time, thereby enabling the resetting of the throttle control fuction to an original proper state.

This out of phase correction is carried out to correct control values and can be executed properly and safely, and therefore the setting of a large driving torque margin is not needed and in addition the open-loop control function will not be sacrificed.

What is claimed is:

1. A fuel mixture control device of an internal-combustion engine having a fuel mixture adjusting means for adjusting a mixture of intake air and fuel supplied to said internal-combustion engine, a motor for driving said fuel mixture adjusting means, and a control value output means for outputting a control value to said step motor, comprising:
   a position sensor for detecting a control position of said fuel mixture adjusting means;
   an out of phase detecting means for detecting an out of phase condition of said step motor on the basis of a control value from said control value output means and a control position detected by said position sensor;
   an out of phase step value computing means for converting, into the number of steps of said step motor, a deviation between said control value and said control position at the time of detection of the out of phase condition of said step motor by said out of phase detecting means; and
   a control value correcting means for correcting said control value of said step motor by the use of the number of steps determined by said out of phase step value computing means.

2. A fuel mixture control device as claimed in claim 1, wherein said control value of said step motor is a stored current position (SM) which is so controlled that said control position will correspond to an indicated value ($TH_O$) of said step motor.

3. A fuel mixture control device of an internal-combustion engine having a fuel mixture adjusting means for adjusting a mixture of intake air and fuel supplied to said internal-combustion engine, a step motor for driving said fuel mixture adjusting means, and a control value output means for outputting a control value to said step motor, said device comprising:
   a position sensor for detecting a control position of said fuel mixture adjusting means;
   an out of phase detecting means for detecting an out of phase condition of said step motor on the basis of a control value from said control value output means and a control position detected by said position sensor;
   a full-close out of phase discriminating means for discriminating whether or not a control value determined at the time of detection of the out of phase condition of said step motor by said out of phase detecting means is smaller than a specific position; and a substituting means for substituting said control value with a specific value when said control position has been discriminated to be smaller than a specific position by said full-close out of phase discriminating means.

4. A fuel mixture control device as claimed in claim 3, wherein said control value of said step motor is a stored current position (SM) which is so controlled that a control position will correspond to an indicated valve ($TH_O$) of said step motor.

* * * * *